June 14, 1966    J. M. DODWELL    3,255,640
SELF-ALIGNING PULLEY SYSTEM
Filed Sept. 16, 1963
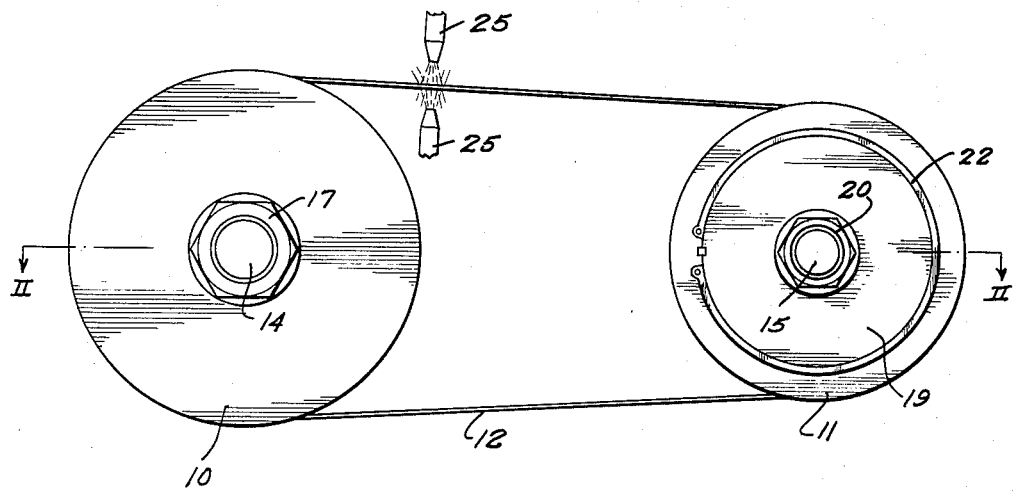
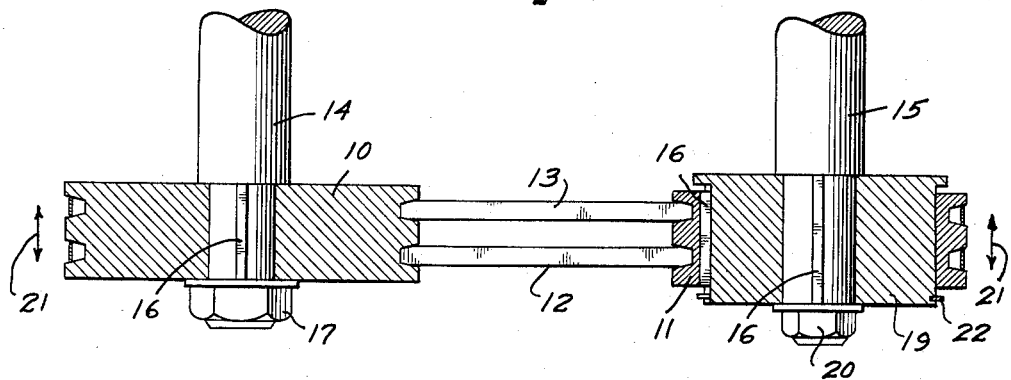
INVENTOR.
John M. Dodwell
BY
ATTORNEYS

United States Patent Office 3,255,640
Patented June 14, 1966

3,255,640
SELF-ALIGNING PULLEY SYSTEM
John M. Dodwell, 2619 N. 5th St., Terrebone,
Quebec, Canada
Filed Sept. 16, 1963, Ser. No. 309,052
6 Claims. (Cl. 74—219)

The present invention relates to belt systems and is, more particularly, concerned with the provision of a novel pulley for combination with thin metal V-belts or the like.

As those skilled in the art of belt drive systems are aware, a very satisfactory, high powered transmission system may be provided by the use of thin metal V-belts running in V-grooves. Such belts and their co-operating pulleys are described and claimed in my earlier United States Letters Patent No. 2,920,494, entitled "Metallic V-belt," issued January 12, 1960. This type of belting has proved itself capable of very satisfactory load transmission, particularly in carefully prealigned pulley systems. It has been found, however, that in some situations, difficulty has been encountered in the field. From a consideration of installations found to create a problem, it has been observed that the difficulty lies in excess strains being imposed edgewise of the thin metal V-belt as a result of axial misalignment of the pulleys over which the belt is trained.

In belt drive systems employing conventional rubber V-belts, experience has shown that moderate amounts of misalignment between drive and driven pulleys are acceptable. Accordingly, in automotive uses such as generator and fan drives, the alignment tolerance has been relatively great. It is not unusual to find fan and generator drive systems designed for use with rubber belts having an axial misalignment of the pulleys on the order of ⅛″ or more. Although such misalignment creates increased friction and power losses in rubber belts, nevertheless, the stresses applied to the belt are not beyond the elastic limit of the belt material. Contrary to this situation, however, the twisting of a thin metal V-belt as a result of axial misalignment of its pulleys will cause the belt to fatigue and rupture in time.

In accordance with the principles of the present invention, a self-aligning pulley system is provided for co-operation with thin sheet metal V-belts. In accordance with the present invention, one or more of the pulleys over which a thin sheet metal belt is run, is provided with an axially slidable connection with its supporting shaft. It has been found in practice that the thin sheet metal V-belt will tend to align itself, and its pulleys, with respect to the shafts through which power is being transferred in such a way as to provide a straight transfer of power perpendicular to such shafts. By providing a splined connection between at least one of the supporting shafts and its respective pulley, permitting axial movement of the shaft relative to the pulley for a dimension on the order of ¼″ or less, any inherent misalignment on the pulley system will be compensated for. Upon achievement of this compensation, it has been found that the thin metal V-belts wear extremely well and are not subject to objectionable noise.

Another aspect of the present invention, similarly found to increase the effective life of the individual thin metal V-belt comprises the method of manufacture thereof which includes as a final step prior to driving the belt under a loaded condition, shot-peening both inner and outer belt surfaces. This shot-peening may be done during or immediately following the precurving of the belt along its length as described in my prior Patent No. 2,920,494, or at any time thereafter.

It is, accordingly, an object of the present invention to provide an improved power transmission pulley system particularly adapted for metallic V-belt drives.

Another object of the invention is to provide an improved belt and pulley transmission system assuring maximum belt life.

A feature of the invention resides in the provision of a drive pulley for thin metal V-belts, which pulley is provided with an axially slidable force transmission connection with its supporting shaft.

Another feature of the invention resides in the treatment of the individual metallic V-belt prior to its use in transmitting power, by shot-peening both the inner and outer surfaces thereof.

Still other and further objects and features of the present invention will become apparent to those skilled in the art from a consideration of the attached drawings and related description, wherein one form of the invention is shown by way of illustration only, and, wherein FIGURE 1 comprises a side-elevational view of a belt and pulley drive system constructed in accordance with the principles of the present invention and FIGURE 2 is a view in cross-section taken along line II—II of FIGURE 1.

As shown on the drawings:

As may be seen from the drawings, the embodiment of the invention illustrated comprises a pair of dual V-grooved pulleys 10 and 11 co-operating with identical thin metallic V-belts 12 and 13 constructed in accordance with my above-mentioned earlier Patent No. 2,920,494. The pulleys 10 and 11 are carried on respective power transmission shafts 14 and 15 and, as may be seen from FIGURE 2, pulley 10 is fixedly secured to shaft 14 by means of a conventional key 16 and nut 17. However, pulley 11 is keyed to shaft 15 via fixed hub 19 and nut 20. A snap ring 22 acts to prevent the pulley 11 from sliding off hub 19. It will be clear, in the arrangement shown, that no misalignment in the axial direction, indicated by arrows 21, can occur between the pulleys 10 and 11 since the belts tend to, and constantly attempt to run perpendicular to the shafts 14 and 15 and will move the pulley 11 axially into a perfectly aligned position.

As pointed out above, an important aspect of the present invention is that of providing a belt and pulley system capable of completely satisfactory use in mass produced drive systems. For example, in the fan and generator drive systems of automotive vehicles, it is necessary that manufacturing tolerances be established. If an automotive engine is to be manufactured at reasonable cost, it is imperative that the tolerances for such accessory items as generators, water pumps, fans, and the like, be relatively non-rigid. By using the belt and pulley system of the present invention, the position tolerance of hub 19, in its axial sense, may be very large and at the same time provide perfect belt alignment. For example, the shaft 15 which may represent a generator shaft, may be given a tolerance position plus or minus ¹⁄₁₆″ in the initial manufacturing set-up.

Under the above circumstances, by providing an excess length hub 19 approximately ¼″ longer than the axial width of the pulley sleeve 11, the pulley will have sufficient freedom to move a distance far in excess of the dimensional tolerance, in either axial direction. This results, of course, in providing a drive system capable of successful operation with thin metallic V-belts without at the same time requiring exact alignment adjustment at the time of installation. Accordingly, it has been found that the drive system of the present invention is readily utilizable in mass produced systems in which relatively loose tolerances are desirable.

In the construction of the mating hub 19 and pulley 11, it has been observed that proper sliding action of the pulley 11 relative to the hub 19 is best accomplished by providing a very close fit between the two. If, for example, a very loose fit is provided between the pulley 11 and the hub 19, axial misalignment of the pulley 11 relative to the pulley 10 is apt to cause an angular cocking of the pulley 11 rather than a smooth axial movement of the pulley 11 along the hub 19 and to its properly aligned position. Accordingly, it is desired that the tolerance between the pulley 11 and the hub 19 be on the order of .002" to .005" and it is preferred, also, that the mating surfaces be ground or otherwise be smooth-surfaced to assure free sliding movement.

As noted above, the proper alignment of the thin metallic V-belts will materially increase their effective life, particularly under irregularly applied loads such as are imposed by intermittently operated machines. An additional means of increasing the life of the belt has been found in the treatment of the belt surfaces by shot-peening. This may be accomplished at any time during or after the precurving of the belt in accordance with the fabrication teachings of the above-mentioned United States Letters Patent No. 2,920,494 and may, if desired, be accomplished at the same time as the belt is run over the precurving pulleys. More particularly, it is preferred that the belt be shot-peened by directing a stream of shots preferably in an air blast, at opposite sides of the belt simultaneously as the belt passes between a pair of shot blast nozzles. For example, arrangement of passing the belt between a pair of nozzles is illustrated in FIGURE 1 where nozzles 25 are shown directing shot at opposite sides of the belt. It has been found that shot-peening of the belt during or following the precurving operation substantially improves the surface of the belt and reduces the formation of fatigue cracks.

From the above description, it will be apparent that I have devised a substantially improved belt and pulley system. Variations and modifications may, of course, be made without departing from the scope of the novel concepts set forth. For example, it will be clear that the hub 19 may be integral with the shaft 15, if desired. Such an arrangement is particularly advantageous when a small diameter pulley 11 is employed. In all cases, however, it is desired that the internal diameter of pulley sleeve 11 be a maximum relative to the outside diameter thereof in order to provide a sleeve-like pulley having a minimum actual tilt movement with a given degree of tilt or cocking should any occur in the pulley sleeve. In view of such variations, it is my intention that the scope of the present invention be limited solely by that of the hereinafter appended claims.

I claim as my invention:

1. Self-aligning pulley mechanism comprising a V-groove pulley, a rotary shaft carrying said pulley, drive means between said pulley and said shaft for causing simultaneous rotation of said pulley and shaft, said drive means comprising axially slidable connection means and abutment means providing limited axial freedom of movement for said pulley as a unit relative to said shaft.

2. A self-aligning belt transmission comprising a pair of power transmission shafts, a V-groove pulley on each of said shafts, drive means between each pulley and its respective shaft requiring the V-pulley to rotate with its respective shaft, a V-belt in drive contact with each V-groove in said pulleys for transmitting power between said pulleys, the drive means between at least one of said pulleys and its respective shaft comprising axially slidable connection means and abutment means providing limited axial freedom of movement for said one pulley as a unit relative to its shaft whereby said one pulley will axially align itself on its shaft to provide exact alignment for said V-belt.

3. Self-aligning pulley mechanism comprising a V-groove pulley sleeve, a rotary shaft carrying said pulley sleeve, drive means between said pulley sleeve and said shaft for causing simultaneous rotation of said pulley sleeve and shaft, said drive means comprising an axially slidable keyed connection in combination with axially spaced abutments providing limited axial freedom of movement for said pulley sleeve as a unit relative to said shaft.

4. A self-aligning belt transmission comprising a pair of power transmission shafts, a V-groove pulley on each of said shafts, drive means between each pulley and its respective shaft requiring the V-pulley to rotate with its respective shaft, a V-belt in drive contact with each V-groove in said pulleys for transmitting power between said pulleys, the drive means between at least one of said pulleys and its respective shaft comprising an axially slidable spline connection in combination with axial positioning abutments carried by said shaft providing limited axial freedom of movement for said one pulley as a unit relative to its respective shaft.

5. A self-aligning belt transmission comprising a pair of power transmission shafts, a V-groove pulley on each of said shafts, drive means between each pulley and its respective shaft requiring the V-pulley to rotate with its respective shaft, a thin metallic V-belt in drive contact with each V-groove in said pulleys for transmitting power between said pulleys, the drive means between at least one of said pulleys and its respective shaft comprising a hub fixedly secured on said shaft, an axially slidable spline connection between said hub and said one pulley in combination with axial positioning abutments on said hub providing limited axial freedom of movement for said pulley as a unit relative to its respective shaft.

6. A self-aligning belt transmission comprising a pair of power transmission shafts, a V-groove pulley on each of said shafts, drive means between each pulley and its respective shaft requiring the V-pulley to rotate with its respective shaft, a thin metallic V-belt in drive contact with each V-groove in said pulleys for transmitting power between said pulleys, the drive means between at least one of said pulleys and its respective shaft comprising an axially slidable spline connection in combination with axial positioning abutments on said shaft providing limited axial freedom of movement for said pulley as a unit relative to its respective shaft, said V-belt having a shot-peened inner and outer surface.

References Cited by the Examiner

UNITED STATES PATENTS

| | | | |
|---|---|---|---|
| 1,031,106 | 7/1912 | Camp | 74—225 X |
| 1,997,284 | 4/1935 | Weston | 74—230.24 X |
| 2,274,515 | 2/1942 | Yelm | 74—234 |
| 2,348,064 | 5/1944 | Gebhardt | 29—90 |
| 2,361,645 | 10/1944 | Nassimbene | 74—234 |
| 2,851,892 | 9/1958 | Parkinson et al. | 74—219 |
| 2,920,494 | 1/1960 | Dodwell | 74—233 |
| 3,049,788 | 8/1962 | Martin | 29—90 |
| 3,058,363 | 10/1962 | Unruh | 74—219 |

DAVID J. WILLIAMOWSKY, *Primary Examiner.*

DON A. WAITE, *Examiner.*

J. A. WONG, *Assistant Examiner.*